(12) United States Patent
Liu et al.

(10) Patent No.: US 12,266,363 B2
(45) Date of Patent: Apr. 1, 2025

(54) SPEECH TO TEXT CONVERSION METHOD, SYSTEM, AND APPARATUS, AND MEDIUM

(71) Applicant: TENCENT TECHNOLOGY (SHENZHEN) COMPANY LIMITED, Shenzhen (CN)

(72) Inventors: Peicheng Liu, Shenzhen (CN); Xiaohao Liu, Shenzhen (CN); Yancan Wang, Shenzhen (CN); Dong Ding, Shenzhen (CN); Kai Tang, Shenzhen (CN); Shan Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 343 days.

(21) Appl. No.: 17/500,011

(22) Filed: Oct. 13, 2021

(65) Prior Publication Data
US 2022/0199087 A1    Jun. 23, 2022

Related U.S. Application Data

(63) Continuation of application No. PCT/CN2021/115897, filed on Sep. 1, 2021.

(30) Foreign Application Priority Data

Dec. 18, 2020  (CN) .......................... 202011504638.0

(51) Int. Cl.
*G06F 40/58*  (2020.01)
*G06F 40/263*  (2020.01)
(Continued)

(52) U.S. Cl.
CPC .......... *G10L 15/26* (2013.01); *G06F 40/263* (2020.01); *G06F 40/58* (2020.01); *G10L 15/005* (2013.01); *G10L 15/07* (2013.01)

(58) Field of Classification Search
None
See application file for complete search history.

(56) References Cited

U.S. PATENT DOCUMENTS

| | | | |
|---|---|---|---|
| 8,700,396 B1 * | 4/2014 | Mengibar | G10L 15/063 704/235 |
| 9,262,405 B1 * | 2/2016 | Baliga | G06Q 30/0255 |

(Continued)

FOREIGN PATENT DOCUMENTS

| | | |
|---|---|---|
| CN | 106875764 A | 6/2017 |
| CN | 110619126 A | 12/2019 |

(Continued)

OTHER PUBLICATIONS

Singapore Office Action including Search Report and Written Opinion regarding 11202111565V dated March 21, 2023.

(Continued)

*Primary Examiner* — Jakieda R Jackson
(74) *Attorney, Agent, or Firm* — Crowell & Moring LLP

(57) ABSTRACT

The present disclosure provides methods, devices, apparatus, and storage medium for performing speech-to-text conversion. The method includes: displaying, by a first device, a first user interface, the first user interface being a display screen of a virtual environment that provides a virtual activity place for a first virtual role controlled by a first user account; displaying, by a second device, a second user interface, the second user interface being a display screen of a virtual environment that provides a virtual activity place for a second virtual role controlled by a second user account; in response to a speech input operation by the first user account performed on the first device, displaying, by the first device, a chat message in a first language, and displaying, by the second device, the chat message in a second language.

11 Claims, 14 Drawing Sheets

(51) Int. Cl.
_G10L 15/00_ (2013.01)
_G10L 15/07_ (2013.01)
_G10L 15/26_ (2006.01)

(56) References Cited

U.S. PATENT DOCUMENTS

| | | | | |
|---|---|---|---|---|
| 9,430,467 | B2* | 8/2016 | Ehsani | G06F 40/51 |
| 9,858,271 | B2* | 1/2018 | Krishna | G06Q 10/103 |
| 10,306,042 | B2* | 5/2019 | Hillier | G10L 15/26 |
| 10,460,746 | B2* | 10/2019 | Costa | G08B 27/001 |
| 10,536,287 | B1* | 1/2020 | Leblang | G10L 15/22 |
| 10,586,369 | B1* | 3/2020 | Roche | G10L 13/00 |
| 11,023,688 | B1* | 6/2021 | Holmdahl | G06F 16/245 |
| 11,321,856 | B1* | 5/2022 | Caldwell | G06T 7/40 |
| 2002/0069048 | A1* | 6/2002 | Sadhwani | G06F 40/40 |
| | | | | 704/3 |
| 2005/0144247 | A1* | 6/2005 | Christensen | H04L 51/04 |
| | | | | 709/204 |
| 2005/0149335 | A1* | 7/2005 | Mesbah | H04M 3/42 |
| | | | | 704/277 |
| 2013/0268259 | A1* | 10/2013 | Kim | G10L 15/22 |
| | | | | 704/7 |
| 2014/0164476 | A1* | 6/2014 | Thomson | G06Q 10/101 |
| | | | | 709/203 |
| 2014/0229157 | A1* | 8/2014 | Leydon | G07F 17/3255 |
| | | | | 704/2 |
| 2014/0303959 | A1* | 10/2014 | Orsini | G06Q 10/107 |
| | | | | 704/2 |
| 2014/0303961 | A1 | 10/2014 | Leydon | |
| 2014/0337989 | A1* | 11/2014 | Orsini | H04L 51/212 |
| | | | | 726/26 |
| 2015/0088485 | A1* | 3/2015 | Alhabobi | H04L 65/403 |
| | | | | 704/2 |
| 2015/0154957 | A1* | 6/2015 | Nakadai | G10L 15/26 |
| | | | | 704/235 |
| 2015/0169551 | A1* | 6/2015 | Yun | G06F 3/04886 |
| | | | | 704/2 |
| 2017/0060850 | A1 | 3/2017 | Lewis et al. | |
| 2017/0171121 | A1* | 6/2017 | Zhang | H04L 67/75 |
| 2017/0270103 | A1* | 9/2017 | Golan | H04W 4/02 |
| 2018/0052831 | A1* | 2/2018 | Ahn | G06F 40/51 |
| 2018/0095624 | A1* | 4/2018 | Osman | G06F 3/167 |
| 2018/0358010 | A1 | 12/2018 | Eidem et al. | |
| 2019/0314728 | A1* | 10/2019 | Sullivan | A63F 13/355 |
| 2019/0392285 | A1* | 12/2019 | Manaharlal Kakkad | H04L 51/02 |
| 2020/0125643 | A1* | 4/2020 | Gutierrez | H04L 63/083 |
| 2020/0204513 | A1* | 6/2020 | Li | G06F 3/04886 |
| 2020/0293622 | A1* | 9/2020 | Orlick | G10L 15/26 |
| 2020/0302126 | A1 | 9/2020 | Malcangio et al. | |
| 2021/0009151 | A1* | 1/2021 | Sasaki | G08G 1/096775 |
| 2021/0232778 | A1* | 7/2021 | Li | H04M 1/658 |
| 2021/0252392 | A1* | 8/2021 | Stevens | G06F 3/016 |
| 2021/0385328 | A1 | 12/2021 | Gu et al. | |

FOREIGN PATENT DOCUMENTS

| | | |
|---|---|---|
| CN | 110730952 A | 1/2020 |
| CN | 110992947 A | 4/2020 |
| CN | 111046680 A | 4/2020 |
| CN | 111309207 A | 6/2020 |
| CN | 111415665 A | 7/2020 |
| CN | 111672099 A | 9/2020 |
| CN | 112494958 A | 3/2021 |
| JP | 2003-205176 | 7/2003 |
| JP | 2008-262580 A | 10/2008 |
| KR | 10-1354087 B1 | 2/2014 |
| KR | 10-2014-0105673 A | 9/2014 |
| WO | WO 2020/153231 A1 | 7/2020 |
| WO | WO 2020149271 A1 | 7/2020 |

OTHER PUBLICATIONS

Japanese Official Action and English translation regarding 2021-564719 dated September 11, 2020.
Japanese Office Action with English translation regarding 2021-564719 dated Mar. 27, 2023.
International Search Report with English Concise Explanation of References regarding PCT/CN2021/115897 dated Nov. 25, 2021.
Second Chinese Office Action with English Concise Explanation of Relevance regarding CN202011504638.0 dated Jun. 20, 2022, 4 pages.
Chinese Office Action with English Concise Explanation of Relevance regarding CN202011504638.0 dated Jan. 25, 2022.
Korean Office Action with English translation, Jul. 10, 2024, pp. 1-24, issued in Korean Application No. 10-2021-7034957, Korean Intellectual Property Office, Daejeon, Korea.

* cited by examiner

US 12,266,363 B2

SPEECH TO TEXT CONVERSION METHOD, SYSTEM, AND APPARATUS, AND MEDIUM

RELATED APPLICATION

This application is a continuation application of PCT Patent Application No. PCT/CN2021/115897, filed on Sep. 1, 2021, which claims priority to Chinese Patent Application No. 202011504638.0, filed with the National Intellectual Property Administration, PRC on Dec. 18, 2020, both of which are incorporated herein by reference in their entireties.

FIELD OF THE TECHNOLOGY

This application relates to the field of human-computer interaction, and in particular, to a speech-to-text conversion method, system, and apparatus, and a medium.

BACKGROUND OF THE DISCLOSURE

In an application based on competitive contention, a plurality of users are divided into two rival teams. The users manipulate virtual roles in a virtual environment to perform actions such as walking, purchasing, healing, and fighting, and the users in the same team collaborate to complete a task in the virtual environment.

In the related art, the implementation of converting speech into text in the application based on competitive contention generally does not have a language conversion function. As a result, users using different language categories communicate in different languages in the same battle, which makes it difficult for the users to communicate with each other.

The present disclosure describes embodiments for performing speech-to-text conversion, addressing at least one of the problems/issues discussed above, improving efficiency and enhancing user experience by eliminating language barriers. In various embodiments, there is no need for the users to use additional translation software to translate chat messages in other language categories, thereby reducing operation steps of the users and improving efficiency of human-computer interaction.

SUMMARY

Embodiments of this application provide methods, apparatus, systems, devices, and storage media for performing speech-to-text conversion, which may improve efficiency and reduce operational steps.

The present disclosure describes a method for performing speech-to-text conversion. The method includes displaying, by a first device, a first user interface, the first user interface being a display screen of a virtual environment that provides a virtual activity place for a first virtual role controlled by a first user account; and displaying, by a second device, a second user interface, the second user interface being a display screen of a virtual environment that provides a virtual activity place for a second virtual role controlled by a second user account. The first device includes a first memory storing instructions and a first processor in communication with the first memory. The second device includes a second memory storing instructions and a second processor in communication with the second memory. The method further includes, in response to a speech input operation by the first user account performed on the first device, displaying, by the first device, a chat message in a first language, and displaying, by the second device, the chat message in a second language, wherein: the first language is a language associated with the first user account or the first device, the second language is a language associated with the second user account or the second device, and text content of the chat message is recognized based on speech content inputted through the speech input operation.

The present disclosure describes a system for performing speech-to-text conversion. The system includes one or more memories storing instructions; and one or more processors in communication with the one or more memories. When the one or more processors execute the instructions, the one or more processors are configured to cause the system to perform: displaying a first user interface on a first device, the first user interface being a display screen of a virtual environment that provides a virtual activity place for a first virtual role controlled by a first user account, displaying a second user interface on a second device, the second user interface being a display screen of a virtual environment that provides a virtual activity place for a second virtual role controlled by a second user account, and in response to a speech input operation by the first user account performed on the first device, displaying, on the first device, a chat message in a first language, and displaying, on the second device, the chat message in a second language, wherein: the first language is a language associated with the first user account or the first device, the second language is a language associated with the second user account or the second device, and text content of the chat message is recognized based on speech content inputted through the speech input operation.

The present disclosure describes a non-transitory computer-readable storage medium, storing computer-readable instructions. The computer-readable instructions, when executed by one or more processors, are configured to cause the one or more processors to perform: displaying a first user interface on a first device, the first user interface being a display screen of a virtual environment that provides a virtual activity place for a first virtual role controlled by a first user account; displaying a second user interface on a second device, the second user interface being a display screen of a virtual environment that provides a virtual activity place for a second virtual role controlled by a second user account; and in response to a speech input operation by the first user account performed on the first device, displaying, on the first device, a chat message in a first language, and displaying, on the second device, the chat message in a second language, wherein: the first language is a language associated with the first user account or the first device, the second language is a language associated with the second user account or the second device, and text content of the chat message is recognized based on speech content inputted through the speech input operation.

Another speech-to-text conversion method is provided, applicable to at least two clients, the method including:

displaying, by a first client, a first user interface, the first user interface being a display screen of a virtual environment that provides a virtual activity place for a first virtual role controlled by a first user account;

displaying, by a second client, a second user interface, the second user interface being a display screen of a virtual environment that provides a virtual activity place for a second virtual role controlled by a second user account; and displaying, by the first client, in response to a speech input operation performed on the first client, in a first language category, a chat message inputted by the first user account, and displaying, by the second client, in a second language category, the chat message transmitted by the first user account, the first language category being a language category associated with the first user account or the first client, the second language category being a language category associated with the second user account or the second client, and text content of the chat message being recognized based on speech content inputted through the speech input operation.

A speech-to-text conversion method is provided, applicable to a server, the method including:

receiving speech content transmitted by a first client;

determining a first language category and a second language category, the first language category being a language category associated with the first user account or the first client, and the second language category being a language category associated with the second user account or the second client;

converting the speech content into a chat message in the first language category according to the speech content and the first language category, text content of the chat message being recognized based on the speech content;

translating to obtain a chat message in the second language category according to the chat message in the first language category and the second language category; and transmitting the chat message in the second language category to the second client.

A speech-to-text conversion system is provided, including a first apparatus and a second apparatus, the system including:

the first apparatus, configured to display a first user interface, the first user interface being a display screen of a virtual environment that provides a virtual activity place for a first virtual role controlled by a first user account; and the second apparatus, configured to display a second user interface, the second user interface being a display screen of a virtual environment that provides a virtual activity place for a second virtual role controlled by a second user account, the first apparatus being further configured to display, in response to a speech input operation performed on the first apparatus, in a first language category, a chat message inputted by the first user account, the first language category being a language category associated with the first user account or a first client, and text content of the chat message being recognized based on speech content inputted through the speech input operation; and the second apparatus being further configured to display, in a second language category, the chat message transmitted by the first user account, the second language category being a language category associated with the second user account or a second client.

A speech-to-text conversion apparatus is provided, including:

a receiving module, configured to receive speech content transmitted by a first client, the receiving module being further configured to determine a first language category and a second language category, the first language category being a language category associated with a first user account or the first client, the first user account being used for controlling a first virtual role in a virtual activity place in a virtual environment provided by the first client, and the second language category being a language category associated with a second user account or a second client, the second user account being used for controlling a second virtual role in a virtual activity place in a virtual environment provided by the second client;

a conversion module, configured to convert the speech content into a chat message in the first language category according to the speech content and the first language category, text content of the chat message being recognized based on the speech content;

a translation module, configured to translate to obtain a chat message in the second language category according to the chat message in the first language category and the second language category; and a transmission module, configured to transmit the chat message in the second language category to the second client.

A computer device is provided, including a memory and one or more processors, the memory storing computer-readable instructions, the computer-readable instructions, when executed by the one or more processors, causing the one or more processors to implement the foregoing speech-to-text conversion method.

One or more non-volatile computer-readable storage media are provided, storing computer-readable instructions, the computer-readable instructions, when executed by one or more processors, causing the one or more processors to implement the foregoing speech-to-text conversion method.

A computer program product or a computer program is provided, the computer program product or the computer program including computer-readable instructions, the computer-readable instructions being stored in a computer-readable storage medium. A processor of a computer device reads the computer-readable instructions from the computer-readable storage medium and executes the computer-readable instructions to cause the computer device to perform the foregoing speech-to-text conversion method.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

Figure 1:
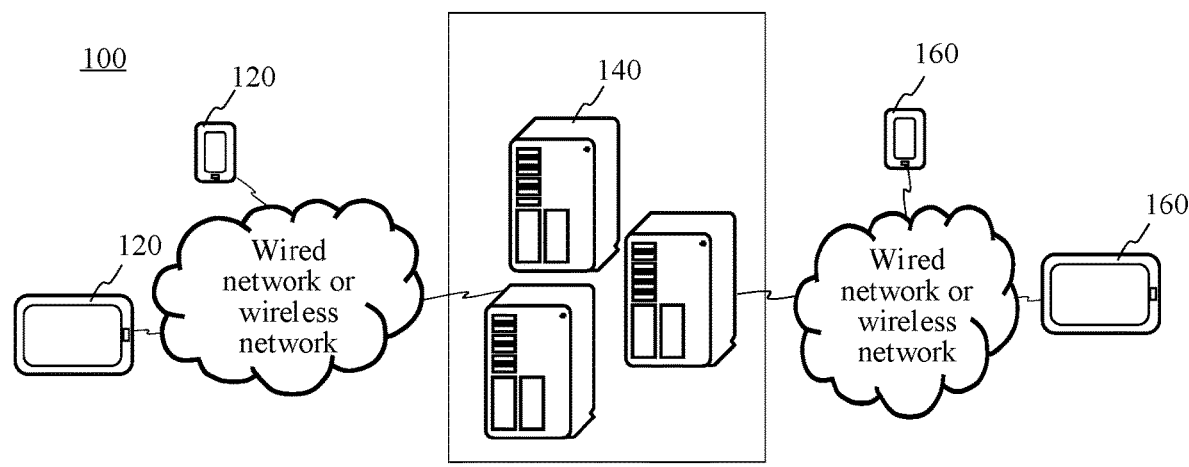
FIG. 1 is a structural block diagram of a computer system according to an exemplary embodiment of this application.

To make objectives, technical solutions, and advantages of this application clearer, implementations of this application are further described below in detail with reference to the accompanying drawings.

First, terms involved in the embodiments of this application are introduced:

Virtual environment: a virtual environment displayed (or provided) when a client runs. The virtual environment may be a three-dimensional virtual environment, or may be a two-dimensional virtual environment. The three-dimensional virtual environment may be a simulated environment of the real world, or may be a semi-simulated semi-fictional environment, or may be an entirely fictional environment.

Virtual role: a movable role in a virtual environment. The movable role may be a virtual character, a virtual animal, an animation character, or the like, for example, a character, an animal, a plant, an oil drum, a wall, or a stone displayed in a virtual environment. Optionally, when the virtual environment is a three-dimensional virtual environment, the virtual role is a three-dimensional model created based on a skeletal animation technology. Each virtual role has a respective shape and volume in the three-dimensional virtual environment, and occupies some space in the three-dimensional virtual environment. Optionally, when the virtual environment is a two-dimensional virtual environment, the virtual role is a two-dimensional plane model created based on an animation technology. Each virtual role has a respective shape and area in the two-dimensional virtual environment, and occupies a part of area in the two-dimensional virtual environment.

Multiplayer online battle arena (MOBA): different virtual teams on at least two rival camps occupy respective map regions in a virtual environment, and contend against each other using a specific victory condition as the goal. The victory condition includes, but is not limited to at least one of occupying forts or destroying forts of the rival camp, killing virtual roles in the rival camp, ensuring own survival in a specified scenario and time, seizing a specific resource, and outscoring the opponent within a specified time. The battle arena may take place in rounds, and each round of the battle arena may have the same map or different maps. Each virtual team includes one or more virtual roles, for example, 1 virtual role, 2 virtual roles, 3 virtual roles, or 5 virtual roles.

MOBA game: a game in which several forts are provided in a virtual environment, and users on different camps control virtual roles to battle in the virtual environment, to occupy forts or destroy forts of the rival camp. For example, in the MOBA game, the users may be divided into two rival camps. The virtual roles controlled by the users are scattered in the virtual environment to contend against each other, and the victory condition is to destroy or occupy all enemy forts. The MOBA game takes place in rounds. A duration of one round of the MOBA game is from a moment at which the game starts to a movement at which the victory condition is met.

First-person shooting (FPS) game: a game in which several forts are provided in a virtual environment, and users on different camps control virtual roles to battle in the virtual environment, to occupy forts or destroy forts of the rival camp, or kill all or some roles of the rival camp. Generally, in the FPS game, a user plays in a first-person perspective, or the user may choose to play in a third-person perspective. For example, in the FPS game, the users may be divided into two rival camps. The virtual roles controlled by the users are scattered in the virtual environment to contend against each other, and the victory condition is to kill all enemy users. The FPS game takes place in rounds. A duration of one round of the FPS game is from a moment at which the game starts to a movement at which the victory condition is met.

Simulation game (SLG): a type of a game in which virtual resources are provided in a virtual environment and that simulates reality. For example, in the SLG, a plurality of users may be respectively divided into single camps, and the plurality of users coordinate to complete a designated task. Optionally, one round of the SLG usually has no specific victory condition.

Speech-to-text Conversion: refers to converting speech content inputted by a user into text and outputting the text. For example, if the user inputs the speech content "Good morning", corresponding text "Good morning" is outputted. Generally, the speech-to-text conversion supports only the conversion of speech content into one language category.

FIG. 1 is a structural block diagram of a computer system according to an exemplary embodiment of this application. The computer system 100 includes a first terminal 120, a server 140, and a second terminal 160.

A client supporting a virtual environment is installed and run on the first terminal 120. The client may be any one of a MOBA game, a virtual reality client, a three-dimensional map client, a military simulation client, an FPS game, a multiplayer shooting survival game, and an SLG. The first terminal 120 is a terminal used by a first user, and a first user account is an account held by the first user. The first user uses the first terminal 120 to operate a first virtual role in a three-dimensional virtual environment to perform activities. The activities include, but are not limited to, at least one of attacking, casting skills, purchasing props, healing, adjusting body postures, crawling, walking, riding, flying, jumping, driving, picking, shooting, and throwing. For example, the first virtual role is a first virtual character.

The first terminal 120 is connected to the server 140 through a wireless network or a wired network.

The server 140 includes at least one of one server, a plurality of servers, a cloud computing platform, and a virtualization center. The server 140 is configured to provide a backend service for a client supporting a virtual environment. Optionally, the server 140 takes on primary computing work, and the first terminal 120 and the second terminal 160 take on secondary computing work; or the server 140 takes on secondary computing work, and the first terminal 120 and the second terminal 160 take on primary computing work; or the server 140, the first terminal 120, and the second terminal 160 perform collaborative computing by using a distributed computing architecture.

A client supporting a virtual environment is installed and run on the second terminal 160. The client may be any one of a MOBA game, a virtual reality client, a three-dimensional map client, a military simulation client, an FPS game, a multiplayer shooting survival game, and an SLG. The second terminal 160 is a terminal used by a second user, and a second user account is an account held by the second user. The second user uses the second terminal 160 to operate a second virtual role in a virtual environment to perform activities. The activities include, but are not limited to, at least one of attacking, casting skills, purchasing props, healing, adjusting body postures, crawling, walking, riding, flying, jumping, driving, picking, shooting, and throwing. For example, the second virtual role is a second virtual character. The first virtual role and the second virtual role may belong to the same team, or the same organization, have a friend relationship with each other, or have a temporary communication permission. The first virtual role and the second virtual role may alternatively belong to different teams or different organizations.

Optionally, the clients installed on the first terminal 120 and the second terminal 160 are the same, or are the same type of clients on different platforms. The first terminal 120 may be generally one of a plurality of terminals, and the second terminal 160 may be generally one of a plurality of terminals. In this embodiment, only the first terminal 120 and the second terminal 160 are used as examples for description. The first terminal 120 and the second terminal 160 are of the same or different device types. The device type includes at least one of a smartphone, a tablet computer, an e-book reader, a Moving Picture Experts Group Audio Layer III (MP3) player, a Moving Picture Experts Group Audio layer Layer IV (MP4) player, a laptop computer, and a desktop computer.

In an exemplary embodiment, a first client on the first terminal 120 may display a first user interface, the first user interface being a display screen of a virtual environment that provides a virtual activity place for a first virtual role controlled by a first user account. A second client on the second terminal 160 may display a second user interface, the second user interface being a display screen of a virtual environment that provides a virtual activity place for a second virtual role controlled by a second user account. In response to a speech input operation performed on the first client, the first client displays, in a first language category, a chat message inputted by the first user account, and the second client displays, in a second language category, the chat message transmitted by the first user account, the first language category being a language category associated with the first user account or the first client, the second language category being a language category associated with the second user account or the second client, and text content of the chat message being recognized based on speech content inputted through the speech input operation.

In this way, when receiving a language input operation, the first client displays chat messages in different language categories on different clients, and inputted speech information can be translated into chat messages in different language categories, which is convenient for users using different language categories to communicate with each other, to eliminate language barriers. In addition, there is no need for the users to use additional translation software to translate chat messages in other language categories, thereby reducing operation steps of the users and improving efficiency of human-computer interaction.

Figure 2:
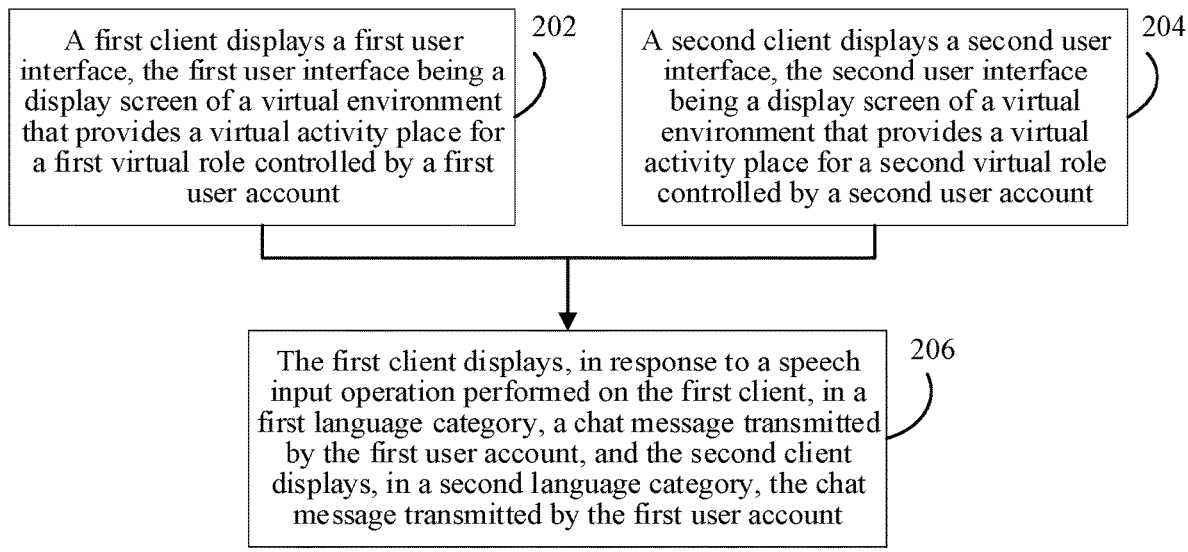
FIG. 2 is a flowchart of a speech-to-text conversion method according to an exemplary embodiment of this application.

FIG. 2 is a flowchart of a speech-to-text conversion method according to an exemplary embodiment of this application. The method may be performed by the first terminal 120 or the second terminal 160 shown in FIG. 1. The method is applied to at least two clients and includes the following steps:

Step 202: A first client displays a first user interface, the first user interface being a display screen of a virtual environment that provides a virtual activity place for a first virtual role controlled by a first user account.

In various implementations, the first client may be referred as a first device or a client running on the first device. The first device may include a first memory storing instructions and a first processor in communication with the first memory.

The first client refers to a client program running on the first terminal. Optionally, the client program includes any one of a MOBA game, a virtual reality client, a three-dimensional map client, a military simulation client, an FPS game, a multiplayer shooting survival game, and an SLG.

The first user account refers to an account held by a first user.

The first virtual role refers to a main control role controlled by the first user in the first client. Optionally, the first virtual role is at least one of a character, an animal, a plant, and an animation character.

The first user interface refers to a screen that can be observed on the first terminal during the running of the first client. Optionally, the first user interface is a screen when the first virtual role is observed through a camera model in the virtual environment.

Optionally, the camera model performs automatic following on the virtual role in the virtual environment, that is, when a position of the virtual role in the virtual environment changes, the camera model changes with the position of the virtual role in the virtual environment, and the camera model is always located in a preset distance range of the virtual role in the virtual environment. Optionally, in the automatic following process, relative positions of the camera model and the virtual role do not change.

The camera model refers to a three-dimensional model located around a virtual role in a virtual environment. When a first-person perspective is used, the camera model is located near the head of the virtual role or at the head of the virtual role. When a third-person perspective is used, the camera model may be located behind the virtual role and bound to the virtual role, or may be located at any position away from the virtual role by a preset distance. The virtual role located in the virtual environment may be observed from different angles by using the camera model. Optionally, when the third-person perspective is a first-person over-shoulder perspective, the camera model is located behind the virtual role (for example, the head and shoulders of a virtual character). Optionally, in addition to the first-person perspective and the third-person perspective, there are other perspectives, such as a top perspective. When the top perspective is used, the camera model may be located above the head of the virtual role. The top perspective is a perspective for observing the virtual environment with an angle from the sky. Optionally, the camera model is not actually displayed in the virtual environment. In other words, the camera model is not displayed in the virtual environment displayed in a user interface.

Description is made by using an example in which the camera model is located at any position away from the virtual role by a preset distance. Optionally, one virtual role corresponds to one camera model, and the camera model may rotate with the virtual role as a rotation center. For example, the camera model rotates with any point of the virtual role as a rotation center. During rotation, the camera model not only rotates at an angle, but also is displaced. During rotation, a distance between the camera model and the rotation center remains unchanged, that is, the camera model rotates on a surface of a sphere with the rotation center as a sphere center. Any point of the virtual role may be the head or the torso of the virtual role, or any point around the virtual role. This is not limited in this embodiment of this application. Optionally, when the virtual role is observed by using the camera model, a center direction of the perspective of the camera model is a direction in which a point of a spherical surface on which the camera model is located points to a sphere center.

Optionally, the virtual role may further be observed by using the camera model at a preset angle in different directions of the virtual role.

Figure 3:
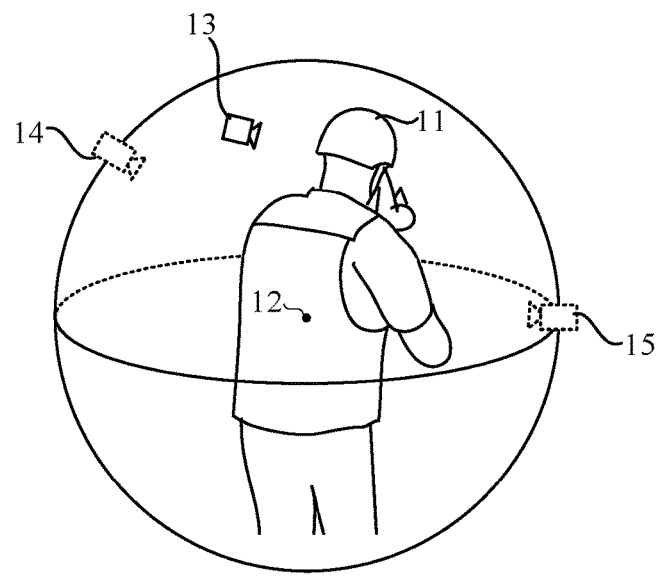
FIG. 3 is a schematic diagram of a camera model according to an exemplary embodiment of this application.

For example, referring to FIG. 3, a point of a virtual role 11 is determined as a rotation center 12, and the camera model rotates around the rotation center 12. Optionally, an initial position is configured for the camera model, and the initial position is a position over the rear of the virtual role (for example, a position behind the head). For example, as shown in FIG. 3, the initial position is a position 13, and when the camera model rotates to a position 14 or a position 15, a direction of a perspective of the camera model changes as the camera model rotates.

Optionally, the first user interface further includes at least one other display element of a chat message, a chat control, a minimap from a perspective of God, a backpack control, a position indicator control, a loudspeaker voice switch, a microphone switch, a control for moving a virtual role, and a control for controlling a virtual role to perform a preset action.

Figure 4:
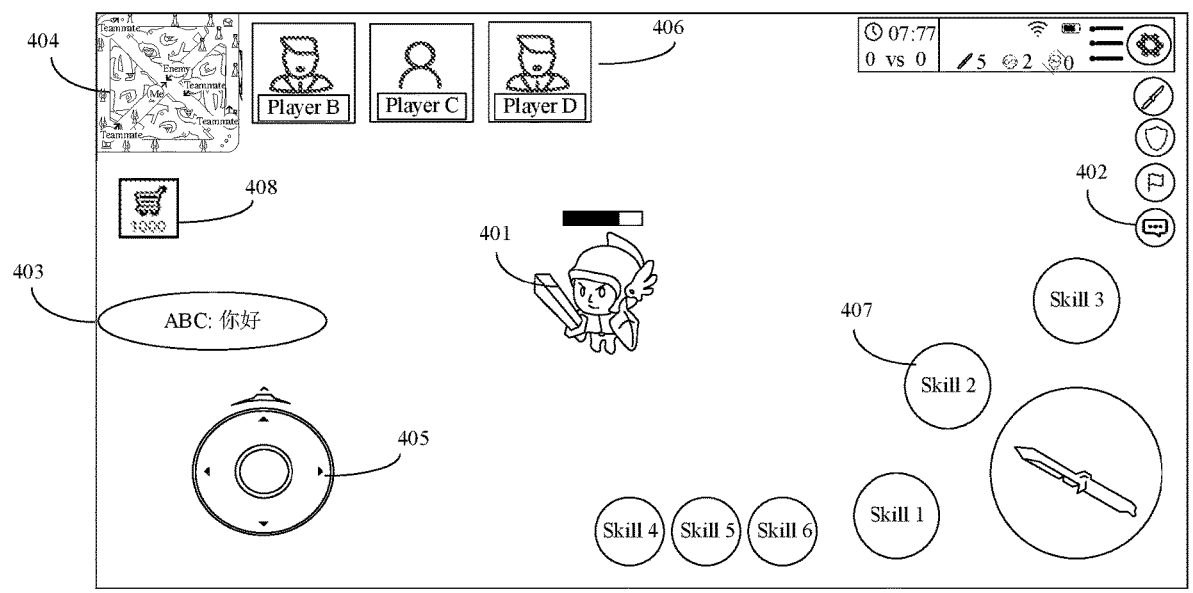
FIG. 4 is a schematic interface diagram of a speech-to-text conversion method according to an exemplary embodiment of this application.

For example, as shown in FIG. 4, the first user interface displays a virtual role 401, a chat control 402, a chat message 403, a minimap 404, a mobile control 405, a user icon 406, a skill control 407, and a purchase control 408.

Step 204: A second client displays a second user interface, the second user interface being a display screen of a virtual environment that provides a virtual activity place for a second virtual role controlled by a second user account.

In various implementations, a second client may be referred as a second device or a client running on the second device. The second device may include a second memory storing instructions and a second processor in communication with the second memory.

The second client refers to a client program running on the second terminal. Optionally, the client program includes any one of a MOBA game, a virtual reality client, a three-dimensional map client, a military simulation client, an FPS game, a multiplayer shooting survival game, and an SLG. Optionally, the second terminal and the first terminal are of the same or different device types.

The second user account is an account held by a second user. The first user account is different from the second user account.

The second virtual role is a main control role controlled by the second user in the second client. Optionally, the second virtual role is at least one of a character, an animal, a plant, and an animation character. The first virtual role and the second virtual role may be the same or may be different.

The second user interface refers to a screen that can be observed on the second terminal during the running of the second client. Optionally, the second user interface is a screen when the second virtual role is observed through a camera model in the virtual environment. Optionally, the second user interface and the first user interface may be the same or different.

Optionally, the second user interface further includes at least one other display element of a chat message, a chat control, a minimap from a perspective of God, a backpack control, a position indicator control, a loudspeaker voice switch, a microphone switch, a control for moving a virtual role, and a control for controlling a virtual role to perform a preset action.

Figure 5:
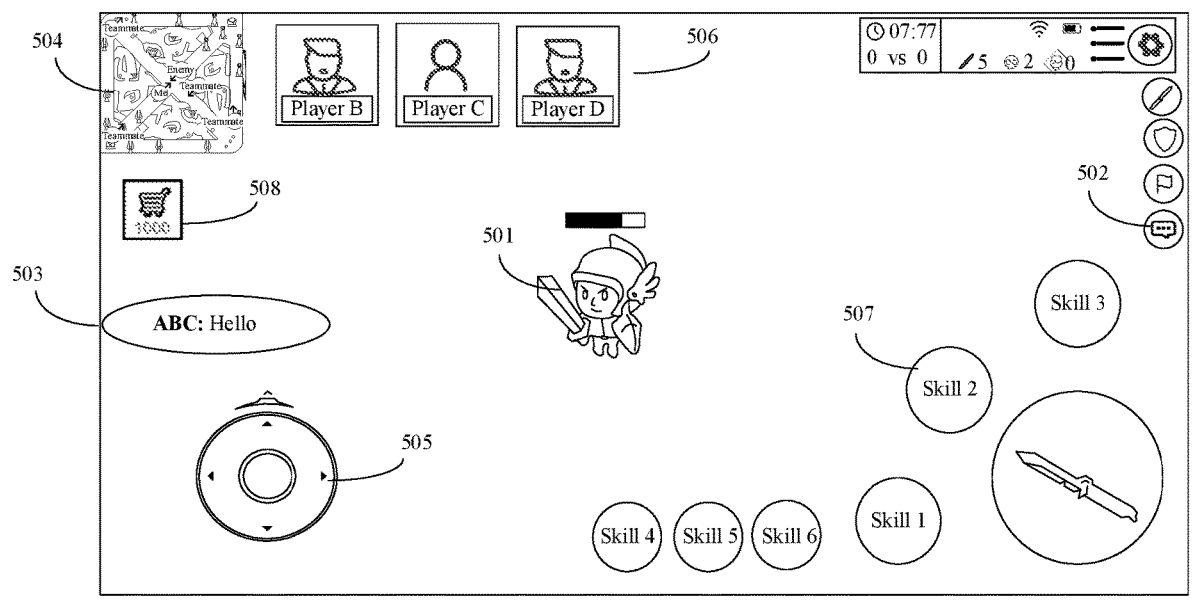
FIG. 5 is a schematic interface diagram of a speech-to-text conversion method according to an exemplary embodiment of this application.

For example, as shown in FIG. 5, the second user interface displays a virtual role 501, a chat control 502, a chat message 503, a minimap 504, a mobile control 505, a user icon 506, a skill control 507, and a purchase control 508.

Step 206: The first client displays, in response to a speech input operation performed on the first client, in a first language category, a chat message inputted by the first user account, and the second client displays, in a second language category, the chat message transmitted by the first user account.

In various embodiments, a language category may be referred as a category of language, or a language. Thus, a first language category may be referred as a first language, and/or a second language category may be referred as a second language.

In various embodiments, step 206 may include, in response to a speech input operation by the first user account performed on the first device, displaying, by the first device, a chat message in a first language, and displaying, by the second device, the chat message in a second language, wherein: the first language is a language associated with the first user account or the first device, the second language is a language associated with the second user account or the second device, and text content of the chat message is recognized based on speech content inputted through the speech input operation.

The speech input operation means that a user enters speech content into a terminal. Optionally, the speech input operation may be performed by pressing one or more preset physical keys to input speech content, or the speech input operation may be performed through a signal generated by touching and holding, clicking/tapping, double-clicking/tapping, and/or sliding on a designated region of a touchscreen, or the speech input operation may be performed by directly inputting speech content through a microphone device.

The first language category and the second language category correspond to different language categories. For example, when the first language category is Chinese, the second language category is English. For example, the language category includes, but is not limited to, at least one of Chinese, English, Japanese, German, Russian, Latin, and French.

The chat message includes a user name and conversation content. The chat messages correspond to the speech content inputted through the speech input operation. For example, speech content entered by a user ABC is "I'm sorry", a chat message in a first language category (e.g., a first language being Chinese) is "ABC: 对不起", and a chat message in the second language category (e.g., a second language being English) is "ABC: I'm sorry". The chat messages and meanings expressed by the chat messages need to correspond to the input content.

Optionally, a display position of the chat message may be set autonomously by the user, for example, at an upper left corner of a user interface, or at a lower right corner of a user interface. A specific display position of the chat message is not limited in this application.

For example, as shown in FIG. 4 and FIG. 5, content of a chat message 403 displayed on the first user interface in FIG. 4 is "ABC: 你好", and content of a chat message 503 displayed on the second user interface in FIG. 5 is "ABC: Hello". The chat message 403 and the chat message 503 are in different language categories, but the meanings expressed by the two are the same.

In conclusion, in this embodiment, the input content of the speech input operation can be translated, and the chat messages in different language categories are displayed on the first client and the second client, which facilitates direct communication between users using different language categories, and improves efficiency of communication between the users. In addition, real-time performance of a system can be improved, which facilitates the users to obtain information about other users in time.

Figure 6:
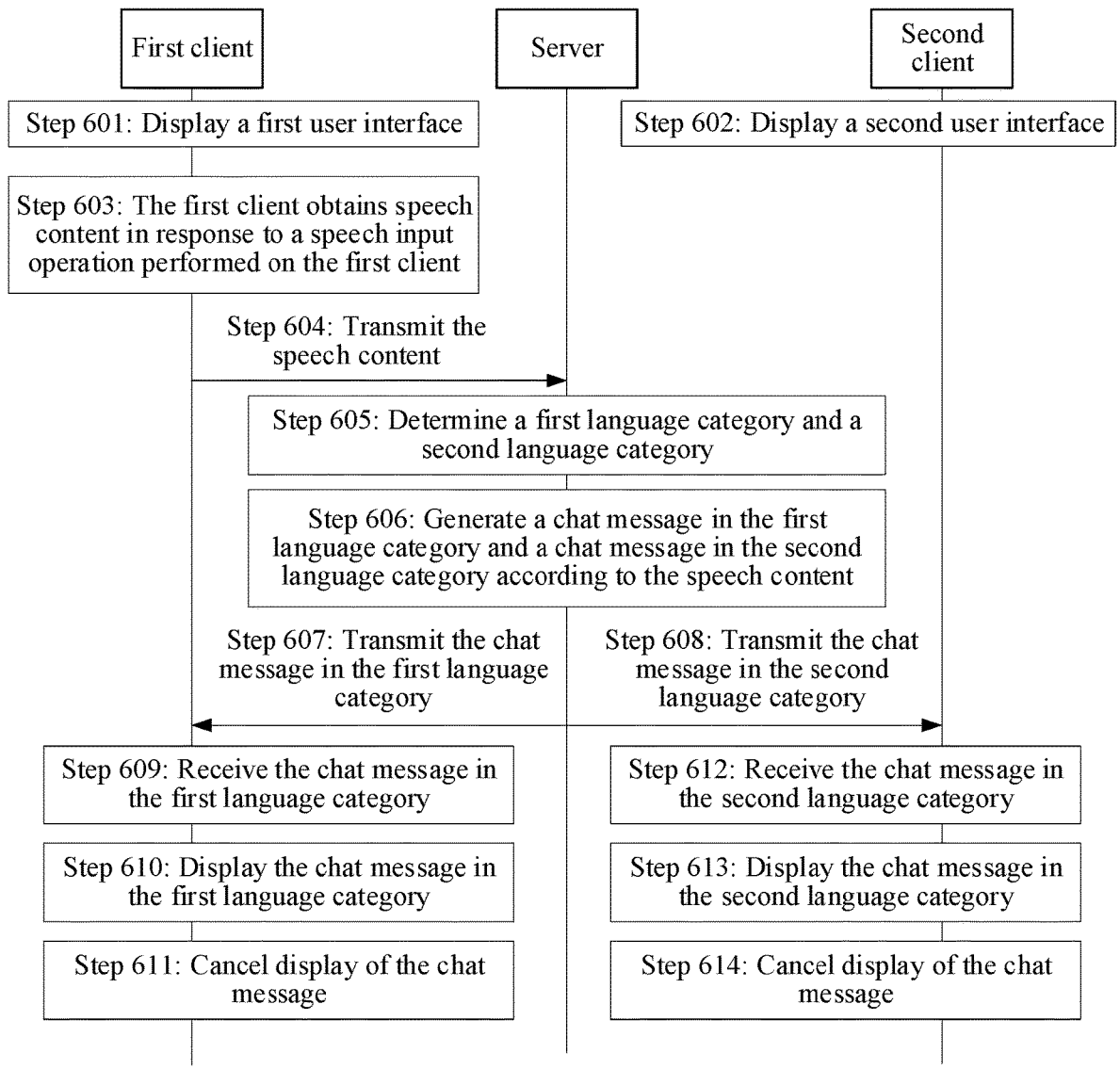
FIG. 6 is a flowchart of a speech-to-text conversion method according to an exemplary embodiment of this application.

FIG. 6 is a flowchart of a speech-to-text conversion method according to an exemplary embodiment of this application. The method may be performed by the first terminal 120 or the second terminal 160 shown in FIG. 1. The method is applied to at least two clients and includes the following steps:

Step 601: Display a first user interface.

A first client displays the first user interface.

Step 602: Display a second user interface.

A second client displays the second user interface.

Step 601 and step 602 may not be implemented in a particular order in time sequence.

Step 603: The first client obtains speech content in response to a speech input operation performed on the first client.

The speech content refers to speech information entered by a user through the first client. Optionally, the first client obtains the speech content by using a speech acquisition device, or the first client downloads the speech content through a network, or the first client receives the speech content transmitted by another client, or the first client queries a local storage to obtain the speech content.

Step 604: Transmit the speech content.

The first client transmits the speech content to a server.

Optionally, the first client transmits the speech content and a first language category to the server.

Step 605: Determine a first language category and a second language category.

The server determines the first language category and the second language category.

The server receives the first language category transmitted by the first client, or the server stores the first language category.

The server receives the second language category transmitted by the second client, or the server stores the second language category.

Optionally, this step includes at least one of the following two steps:

1. The first client transmits the first language category to the server.

The server receives the first language category transmitted by the first client, and determines the first language category.

For example, the first client transmits version information to the server, the version information including the first language category, or the first client transmits geographic information to the server, the geographic information being corresponding to the first language category. For example, if the geographic information indicates that the first client is in China, the first language category is Chinese, or the first client transmits a language setting of the first terminal to the server, the language setting including the first language category.

2. The second client transmits the second language category to the server.

The server receives the second language category transmitted by the second client, and determines the second language category.

Optionally, the server receives the second language category transmitted by the second client, to determine the second language category. For example, the second client transmits version information to the server, the version information including the second language category, or the second client transmits geographic information to the server, the geographic information being corresponding to the second language category. For example, if the geographic information indicates that the second client is in China, the second language category is Chinese, or the second client transmits a language setting of the second terminal to the server, the language setting including the second language category.

Optionally, the second client receives a language category obtaining request transmitted by the server, and the second client transmits the second language category to the server according to the language category obtaining request, the language category obtaining request being used by the server to request the client to transmit a language category.

Step 606: Generate a chat message in the first language category and a chat message in the second language category according to the speech content.

The server generates the chat message in the first language category and the chat message in the second language category according to the speech content.

Optionally, the server converts the speech content into the chat message in the first language category, and then translates the chat message in the first language category into the chat message in the second language category. For example, the server converts speech content "对不起" into a chat message "对不起" in the first language category, and then translates the chat message "对不起" in the first language category into a chat message "I'm sorry" in the second language category.

Optionally, the first client generates the chat message in the first language category according to the speech content, the first client transmits the chat message in the first language category to the server, and the server generates the chat message in the second language category according to the chat message in the first language category. That is, a task of generating the chat message in the first language category is performed by the first client.

Step 607: Transmit the chat message in the first language category.

The server transmits the chat message in the first language category to the first client.

Step 608: Transmit the chat message in the second language category.

The server transmits the chat message in the second language category to the second client.

Step 607 and step 608 may not be implemented in a particular order in time sequence.

Step 609: Receive the chat message in the first language category.

The first client receives the chat message in the first language category transmitted by the server.

Step 610: Display the chat message in the first language category.

The first client displays the chat message in the first language category on the first user interface.

Step 611: Cancel display of the chat message.

The first client cancels the display of the chat message in the first language category.

Optionally, the first client cancels the display of the chat message in a case that a display time of the chat message displayed in the first language category reaches a preset duration. For example, after the chat message is displayed for 10 seconds, the first client cancels the display of the chat message.

Optionally, the first client cancels the display of the chat message in response to a first display cancel operation. The first display cancel operation is used for canceling the display of the chat message. The first display cancel operation may be performed by pressing one or more preset physical keys to cancel the display of the chat message, or the first display cancel operation may be performed through a signal generated by touching and holding, clicking/tapping, double-clicking/tapping, and/or sliding on a designated region of a touchscreen, or the first display cancel operation may be performed by recognizing inputted speech content.

Step 612: Receive the chat message in the second language category.

Optionally, the second client receives the chat message in the first language category transmitted by the server, and the second client determines the chat message in the second language category according to the chat message in the first language category and the second language category. That is, a task of determining the chat message in the second language category is performed by the second client.

Step 613: Display the chat message in the second language category.

Figure 7:
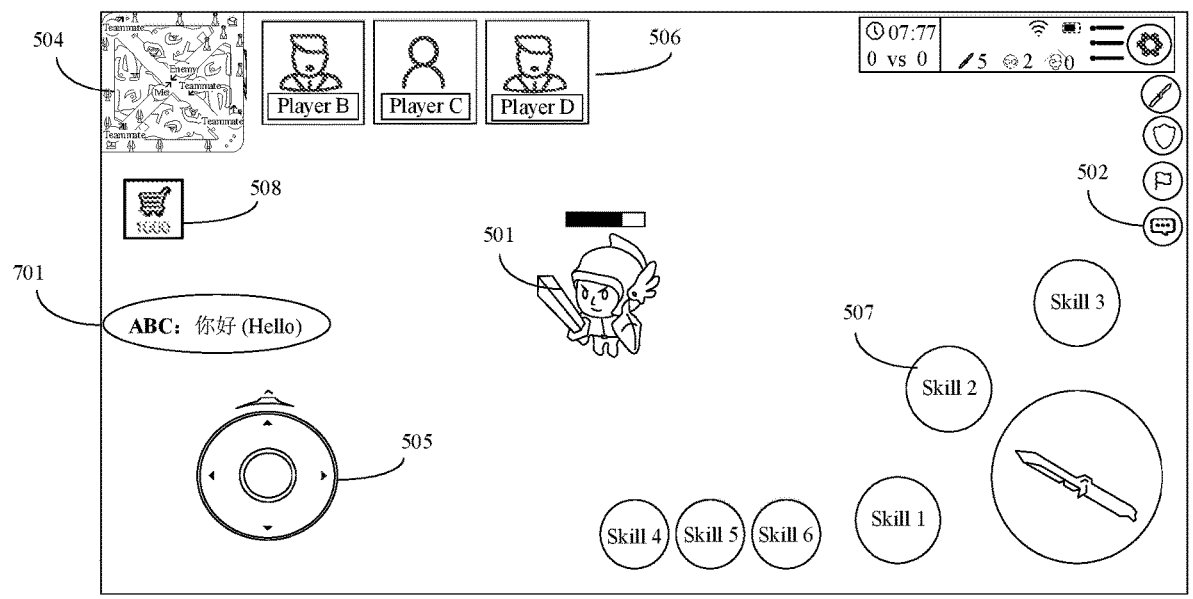
FIG. 7 is a schematic interface diagram of a speech-to-text conversion method according to an exemplary embodiment of this application.

Optionally, the second client displays the chat message in the first language category and the chat message in the second language category on the second user interface in response to the speech input operation performed on the first client. As shown in FIG. 7, the chat messages displayed on the second user interface include the chat message in the first language category and the chat message in the second language category, the chat message in the first language category being "你好", and the chat message in the second language category being "Hello". In addition, simultaneously displaying the chat message in the first language category and the chat message in the second language category can help the user learn other language categories, and facilitate the user to better communicate in the future.

Step 614: Cancel display of the chat message.

The second client cancels the display of the chat message in the second language category.

Optionally, the second client cancels the display of the chat message in a case that a display time of the chat message displayed in the second language category reaches a preset duration. For example, after the chat message is displayed for 10 seconds, the second client cancels the display of the chat message.

Optionally, the second client cancels the display of the chat message in response to a second display cancel operation. The second display cancel operation is used for canceling the display of the chat message. The second display cancel operation may be performed by pressing one or more preset physical keys to cancel the display of the chat message, or the second display cancel operation may be performed through a signal generated by touching and holding, clicking/tapping, double-clicking/tapping, and/or sliding on a designated region of a touchscreen, or the second display cancel operation may be performed by recognizing inputted speech content. Specific operation manners of the second display cancel operation and the first display cancel operation may be the same or may be different. This is not specifically limited in this application.

In conclusion, in this embodiment, the input content of the speech input operation can be translated, and the chat messages in different language categories are displayed on the first client and the second client, which facilitates direct communication between users using different language categories, and improves efficiency of communication between the users.

Moreover, speech conversion and chat message translation are performed by using the server, so that the obtained chat messages are more accurate, and accuracy of speech conversion and information translation is improved.

In addition, the user may further cancel the display of the chat messages according to a requirement of the user to prevent the chat messages from interfering with user operations.

In this application, the user may further implement speech-to-text conversion in a shortcut.

Figure 8:
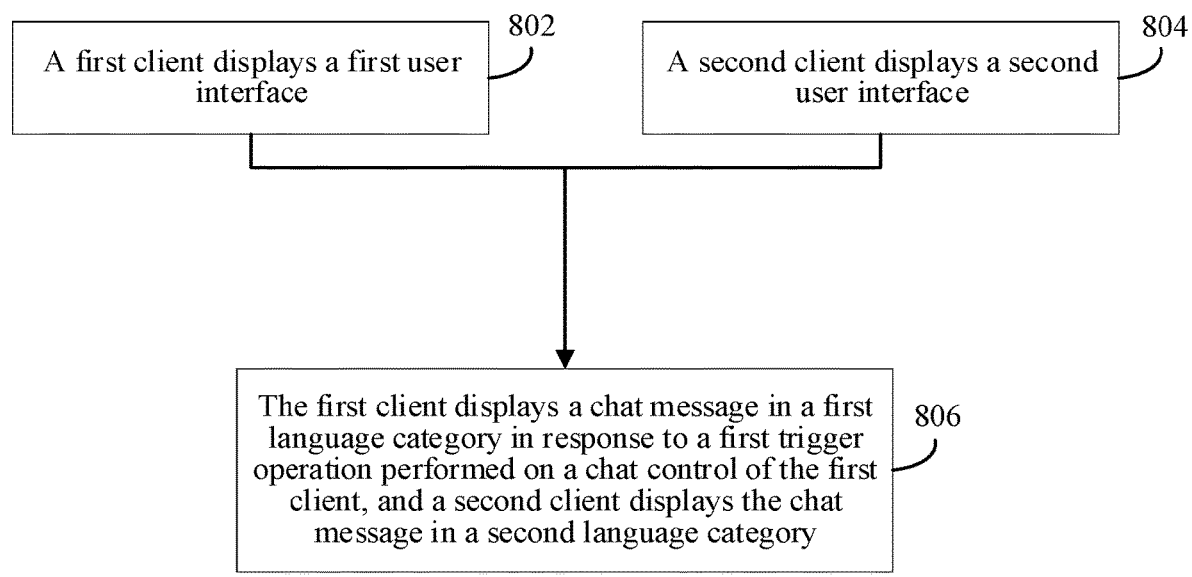
FIG. 8 is a flowchart of a speech-to-text conversion method according to an exemplary embodiment of this application.

FIG. 8 is a flowchart of a speech-to-text conversion method according to an exemplary embodiment of this application. The method may be performed by the first terminal 120 or the second terminal 160 shown in FIG. 1. The method is applied to at least two clients and includes the following steps.

Based on the optional embodiment of the embodiment in FIG. 2, the foregoing step 202 to step 204 may alternatively be implemented as the following step 802 to step 804.

Step 802: A first client displays a first user interface.

Step 804: A second client displays a second user interface.

Step 806: The first client displays a chat message in a first language category in response to a first trigger operation performed on a chat control on the first client, and the second client displays the chat message in a second language category.

The chat control is configured to perform information communication between users of different clients. For example, a user clicks/taps the chat control and enters text.

The first trigger operation is used for a user using the first client to input speech content. The first trigger operation may be performed by pressing one or more preset physical keys to input the speech content, or the first trigger operation may be performed through a signal generated by touching and holding, clicking/tapping, double-clicking/tapping, and/or sliding on a designated region of a touchscreen.

Optionally, an implementation of inputting speech content and displaying a chat message is provided:

1. In response to an input start operation performed on the chat control on the first client, the first client displays a speech recording prompt at a peripheral position of the chat control, to start receiving speech content.

The input start operation is used for controlling the first client to start receiving the speech content. The input start operation may be performed by pressing one or more preset physical keys to receive the speech content, or the input start operation may be performed through a signal generated by touching and holding, clicking/tapping, double-clicking/tapping, and/or sliding on a designated region of a touchscreen.

The speech recording prompt is used for prompting a user that the first client is receiving the speech content. Optionally, the speech recording prompt is at least one or a combination of more of text, an icon, sound, an image, vibration feedback, and light.

Optionally, the speech recording prompt is displayed on at least one of an upper side, a lower side, a left side, a right side, an upper left side, a lower left side, an upper right side, and a lower right side of the chat control.

Figure 9:
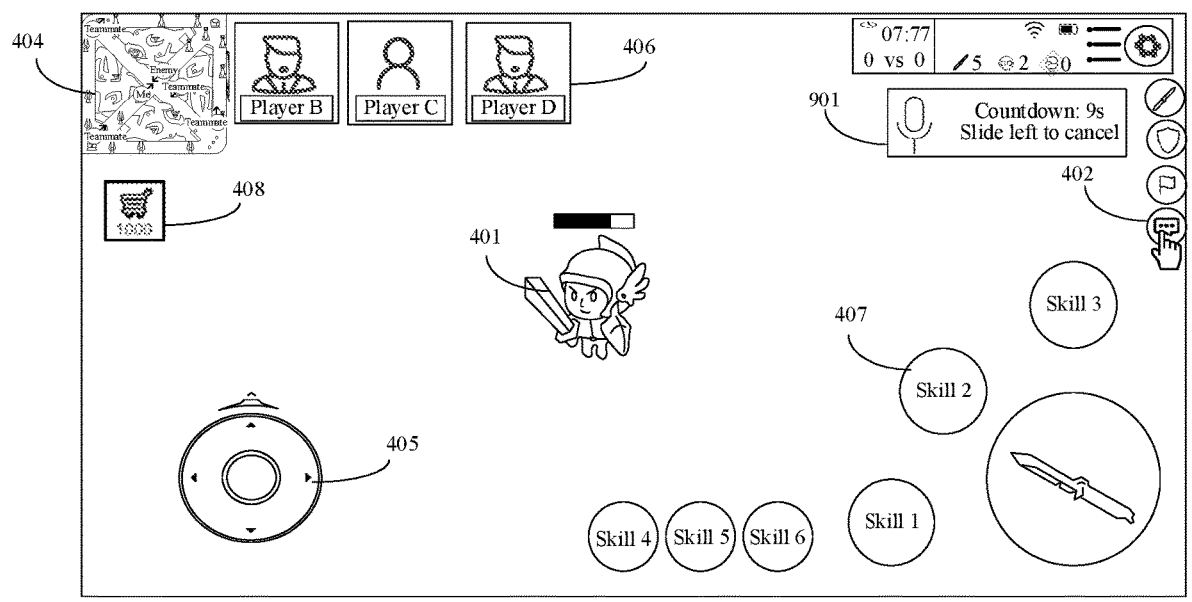
FIG. 9 is a schematic interface diagram of a speech-to-text conversion method according to an exemplary embodiment of this application.

For example, as shown in FIG. 9, the user touches and holds a chat control 402 on the first client to display a speech recording prompt 901. The speech recording prompt 901 displays a microphone icon and a text prompt: "Countdown: 9 s" and "Slide left to cancel".

2. In response to an input end operation performed on the chat control on the first client, the first client cancels display of the speech recording prompt, to end receiving the speech content.

The input end operation is used for controlling the first client to end receiving the speech content. The input end operation may be performed by pressing one or more preset physical keys to end the speech content, or the input end operation may be performed through a signal generated by touching and holding, clicking/tapping, double-clicking/tapping, and/or sliding on a designated region of a touchscreen.

Optionally, when an input duration of the speech content reaches a duration threshold, the first client cancels the display of the speech recording prompt, to end receiving the speech content. For example, when the user enters speech content of 10 s, the input duration of the speech content reaches the duration threshold, and the first client ends receiving the speech content.

Figure 10:
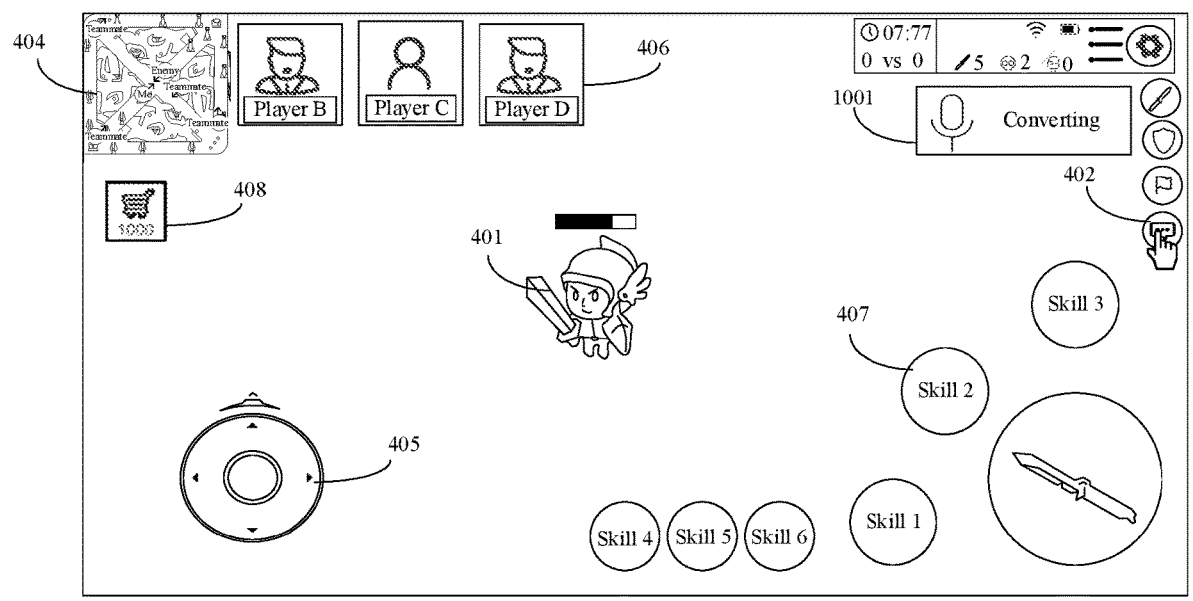
FIG. 10 is a schematic interface diagram of a speech-to-text conversion method according to an exemplary embodiment of this application.

For example, as shown in FIG. 10, the user touches and holds a chat control 402 to input speech content, and the user releases the chat control 402 to end inputting the speech content, or the user continues to touch and hold the chat control for 9 s until the duration threshold is reached, and the first client ends receiving the speech content.

For example, as shown in FIG. 10, a conversion prompt 1001 is displayed during a speech conversion process, and the conversion prompt 1001 displays "Converting".

Optionally, after completing the input of the speech content, the first client displays a speech conversion prompt. The speech conversion prompt is used for prompting the user that the input of the speech content has been completed and the speech content is being converted into a chat message. The speech conversion prompt is at least one or a combination of more of text, an icon, sound, an image, vibration feedback, and light.

3. The first client displays the chat message in the first language category, and the second client displays the chat message in the second language category.

For example, as shown in FIG. 4 and FIG. 5, the first client displays the chat message 403 in the first language category, and the second client displays the chat message 503 in the second language category, the chat message 403 being "ABC: 你好", and the chat message 503 being "ABC: Hello".

In conclusion, this embodiment provides a shortcut for the user to input the speech content, which facilitates the user to quickly input the speech content, thereby reducing the operation steps of the user, and improving the efficiency of human-computer interaction.

Figure 11:
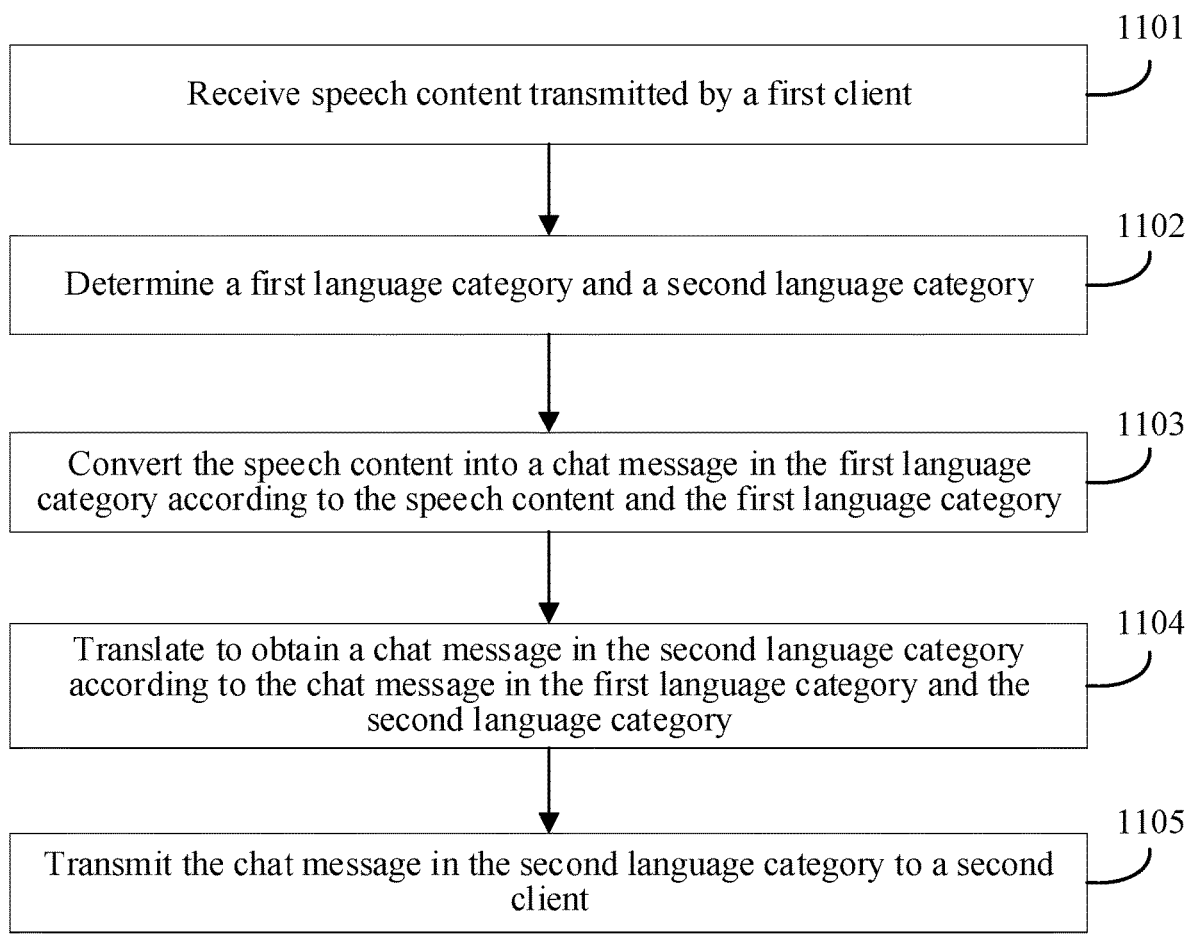
FIG. 11 is a flowchart of a speech-to-text conversion method according to an exemplary embodiment of this application.

FIG. 11 is a flowchart of a speech-to-text conversion method according to an exemplary embodiment of this application. The method may be performed by the server 140 shown in FIG. 1. The server 140 is connected to at least two clients. The method includes the following steps:

Step 1101: Receive speech content transmitted by a first client.

The server receives the speech content transmitted by the first client.

Step 1102: Determine a first language category and a second language category.

Optionally, the server receives the first language category transmitted by the first client, to determine the first language category.

Optionally, the first client transmits version information to the server, the version information including the first language category, or the first client transmits geographic information to the server, the geographic information being corresponding to the first language category. For example, if the geographic information indicates that the first client is in China, the first language category is Chinese, or the first client transmits a language setting of the first terminal to the server, the language setting including the first language category.

Optionally, the server receives the second language category transmitted by the second client, to determine the second language category.

Optionally, the second client transmits version information to the server, the version information including the second language category, or the second client transmits geographic information to the server, the geographic information being corresponding to the second language category. For example, if the geographic information indicates that the second client is in China, the second language category is Chinese, or the second client transmits a language setting of the second terminal to the server, the language setting including the second language category.

Optionally, the server transmits a language category obtaining request to the second client, and the server receives the second language category transmitted by the second client, the language category obtaining request being used by the server to request the client to transmit a language category.

Step 1103: Convert the speech content into a chat message in the first language category according to the speech content and the first language category.

Optionally, the server converts the speech content into the chat message. For example, the server converts speech content "对不起" into a chat message "对不起".

Step 1104: Translate to obtain a chat message in the second language category according to the chat message in the first language category and the second language category.

Optionally, the server translates the chat message in the first language category into the chat message in the second language category. For example, the server translates the chat message "对不起" in the first language category into the chat message "I'm sorry" in the second language category.

Step 1105: Transmit the chat message in the second language category to the second client.

The server transmits the chat message in the second language category to the second client.

In conclusion, in this embodiment, in the server, the speech content is converted into the chat message, and the chat message is translated into another chat message, which facilitates direct communication between users using different language categories, and improves efficiency of communication between the users. In addition, using the server can improve accuracy of conversion and translation, and provide the users with more accurate results.

Optionally, this application is applied to a MOBA game. For example, when a user A and a user B are playing a MOBA game, after the user A inputs speech content in Chinese, a chat message in Chinese is displayed on a client of the user A, and a chat message in English is displayed on a client of the user B.

Optionally, this application is applied to an FPS game. For example, when a user A and a user B are playing an FPS game, after the user A inputs speech content in Chinese, a chat message in Chinese is displayed on a client of the user A, and a chat message in English is displayed on a client of the user B.

Optionally, this application is applied to an SLG. For example, when a user A and a user B are playing an SLG, after the user A inputs speech content in Chinese, a chat message in Chinese is displayed on a client of the user A, and a chat message in Japanese is displayed on a client of the user B.

In an exemplary embodiment, a speech-to-text conversion method is further provided. The method may be performed by the first terminal 120 shown in FIG. 1. The method includes:

displaying a first user interface, the first user interface being a display screen of a virtual environment that provides a virtual activity place for a first virtual role controlled by a first user account;

displaying, in response to a speech input operation performed on a first client, in a first language category, a chat message inputted by the first user account; and transmitting the chat message to a second terminal, for a second client on the second terminal to display, in a second language category, the chat message transmitted by the first user account, the first language category being a language category associated with the first user account or the first client, the second language category being a language category associated with the second user account or the second client, and text content of the chat message being recognized based on speech content inputted through the speech input operation.

In conclusion, in this embodiment, the input content of the speech input operation can be translated, and the chat messages in different language categories are displayed on the first client and the second client, which facilitates direct communication between users using different language categories, and improves efficiency of communication between the users. In addition, real-time performance of a system can be improved, which facilitates the users to obtain information about other users in time.

Figure 12:
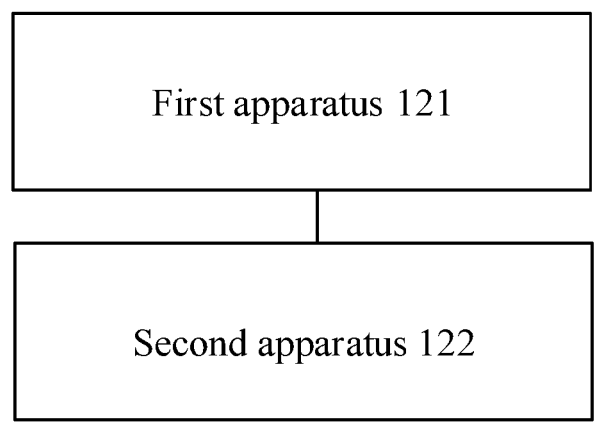
FIG. 12 is a schematic structural diagram of a speech-to-text conversion system according to an exemplary embodiment of this application.

FIG. 12 is a schematic structural diagram of a speech-to-text conversion system according to an exemplary embodiment of this application. The system may be implemented as an entire or a part of a computer device by using software, hardware, or a combination thereof. The system 120 includes a first apparatus 121 and a second apparatus 122. The system specifically includes:

a first apparatus 121, configured to display a first user interface, the first user interface being a display screen of a virtual environment that provides a virtual activity place for a first virtual role controlled by a first user account; and a second apparatus 122, configured to display a second user interface, the second user interface being a display screen of a virtual environment that provides a virtual activity place for a second virtual role controlled by a second user account;

the first apparatus 121 being further configured to display, in response to a speech input operation performed on the first apparatus 121, in a first language category, a chat message inputted by the first user account, the first language category being a language category associated with the first user account or a first client, and text content of the chat message being recognized based on speech content inputted through the speech input operation; and the second apparatus 122 being further configured to display, in a second language category, the chat message transmitted by the first user account, the second language category being a language category associated with the second user account or a second client.

In an optional design of this application, the first apparatus 121 is further configured to obtain the speech content in response to the speech input operation performed on the first apparatus 121; transmit the speech content to a server, the server being configured to generate the chat message in the first language category and the chat message in the second language category according to the speech content; and display the chat message in the first language category after receiving the chat message transmitted by the server.

In an optional design of this application, the second apparatus 122 is further configured to display the chat message in the second language category after receiving the chat message transmitted by the server.

In an optional design of this application, the first apparatus 121 is further configured to transmit the first language category to the server.

In an optional design of this application, the second apparatus 122 is further configured to transmit the second language category to the server.

In an optional design of this application, the first apparatus 121 is further configured to transmit the speech content and the first language category to the server.

In an optional design of this application, the second apparatus 122 is further configured to receive a language category obtaining request transmitted by the server, and transmit the second language category to the server according to the language category obtaining request.

In an optional design of this application, the first apparatus 121 is further configured to display the chat message in the first language category in response to a first trigger operation performed on a chat control on the first apparatus 121.

In an optional design of this application, the second apparatus 122 is further configured to display the chat message in the second language category in response to a first trigger operation performed on a chat control on the first apparatus 121.

In an optional design of this application, the first apparatus 121 is further configured to display a speech recording prompt at a peripheral position of a chat control on the first apparatus 121 in response to an input start operation performed on the chat control, to start receiving the speech content; and cancel display of the speech recording prompt in response to an input end operation performed on the chat control on the first apparatus, to end receiving the speech content.

In an optional design of this application, the first apparatus 121 is further configured to cancel display of the chat message in a case that a display time of the chat message displayed in the first language category reaches a preset duration, or cancel display of the chat message in response to a first display cancel operation.

In an optional design of this application, the second apparatus 122 is further configured to cancel display of the chat message in a case that a display time of the chat message displayed in the second language category reaches a preset duration, or cancel display of the chat message in response to a second display cancel operation.

In an optional design of this application, the second apparatus 122 is further configured to display the chat message in the first language category and the second language category in response to the speech input operation performed on the first apparatus 121.

In some implementations, in response to the speech input operation performed on the first apparatus 121, the second apparatus 122 may be configured to display the chat message in two languages (one language is the first language category and another language is the second language category). This may avoid any inaccurate information associated with translation of the chat message from the first language to the second language, which is particularly beneficial to a second account user who understands the first language.

In conclusion, in this embodiment, when receiving a language input operation, the first client displays the chat messages in different language categories on different clients, and inputted speech information can be translated into chat messages in different language categories, which is convenient for users using different language categories to communicate with each other, to eliminate language barriers. In addition, there is no need for the users to use additional translation software to translate chat messages in other language categories, thereby reducing operation steps of the users and improving efficiency of human-computer interaction.

In an exemplary embodiment of this application, a speech-to-text conversion apparatus is further provided. The apparatus may be implemented as an entire or a part of a first terminal by using software, hardware, or a combination thereof. The apparatus specifically includes:

a display module, configured to display a first user interface, the first user interface being a display screen of a virtual environment that provides a virtual activity place for a first virtual role controlled by a first user account, the display module being further configured to display, in response to a speech input operation performed on a first client, in a first language category, a chat message inputted by the first user account; and a transmission module, configured to transmit the chat message to a second terminal, for a second client on the second terminal to display, in a second language category, the chat message transmitted by the first user account, the first language category being a language category associated with the first user account or the first client, the second language category being a language category associated with the second user account or the second client, and text content of the chat message being recognized based on speech content inputted through the speech input operation.

In conclusion, in this embodiment, the input content of the speech input operation can be translated, and the chat messages in different language categories are displayed on the first client and the second client, which facilitates direct communication between users using different language categories, and improves efficiency of communication between the users. In addition, real-time performance of a system can be improved, which facilitates the users to obtain information about other users in time.

Figure 13:
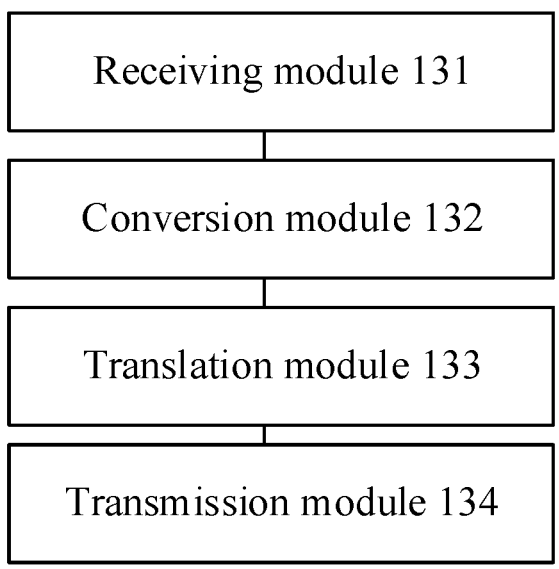
FIG. 13 is a schematic structural diagram of a speech-to-text conversion apparatus according to an exemplary embodiment of this application.

FIG. 13 is a schematic structural diagram of a speech-to-text conversion apparatus according to an exemplary embodiment of this application. The apparatus may be implemented as an entire or a part of a server by using software, hardware, or a combination thereof. The apparatus 130 includes:

a receiving module 131, configured to receive speech content transmitted by a first client, the receiving module 131 being further configured to determine a first language category and a second language category;

a conversion module 132, configured to convert the speech content into a chat message in the first language category according to the speech content and the first language category, text content of the chat message being recognized based on the speech content;

a translation module 133, configured to translate to obtain a chat message in the second language category according to the chat message in the first language category and the second language category; and a transmission module 134, configured to transmit the chat message in the second language category to the second client.

In an optional design of this application, the receiving module 131 is further configured to receive a first language category transmitted by the first client; and receive a second language category transmitted by the second client.

In an optional design of this application, the transmission module 134 is further configured to transmit a language category obtaining request to the second client.

In conclusion, in this embodiment, in the server, the speech content is converted into the chat message in the first language category, and the chat message in the first language category is translated into the chat message in the second language category, which facilitates direct communication between users using different language categories, and improves efficiency of communication between the users. In addition, using the server can improve accuracy of conversion and translation, and provide the users with more accurate results.

This application further provides a terminal, including a processor and a memory, the memory storing at least one instruction, the at least one instruction being loaded and executed by the processor to implement the speech-to-text conversion method provided in the foregoing method embodiments. The terminal may be a terminal provided in FIG. 14 below.

Figure 14:
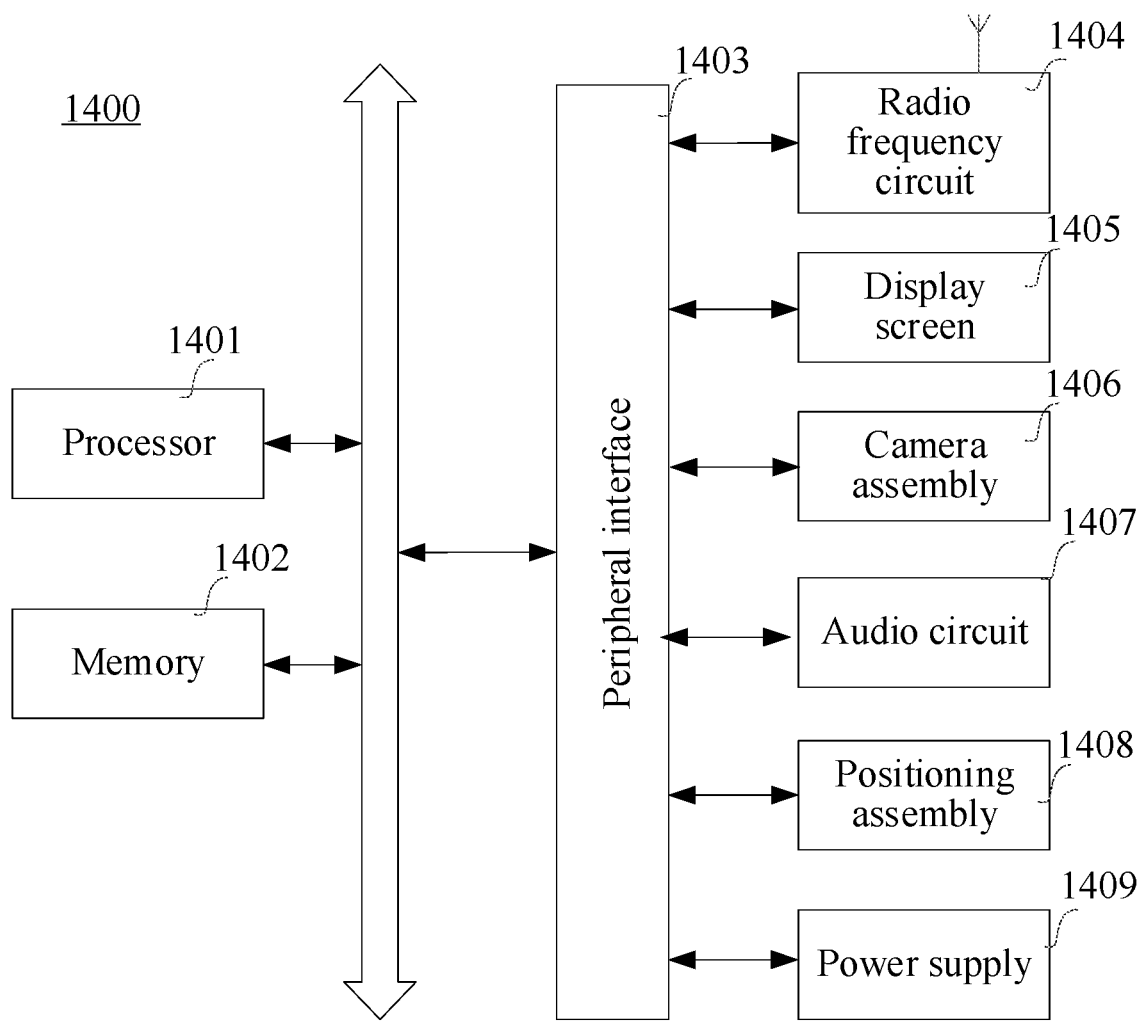
FIG. 14 is a structural block diagram of a terminal according to an exemplary embodiment of this application.

FIG. 14 is a structural block diagram of a terminal according to an exemplary embodiment of this application. The terminal may be the first terminal or the second terminal described above. The terminal 1400 may be a smartphone, a tablet computer, an MP3 player, an MP4 player, a notebook computer, or a desktop computer. The terminal 1400 may also be referred to as another name such as user equipment, a portable terminal, a laptop terminal, or a desktop terminal.

Generally, the terminal 1400 includes a processor 1401 and a memory 1402.

The processor 1401 may include one or more processing cores, for example, a 4-core processor or an 8-core processor. The processor 1401 may be implemented in at least one hardware form of a digital signal processor (DSP), a field programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process data in a standby state. In some embodiments, a graphics processing unit (GPU) may be integrated into the processor 1401. The GPU is configured to be responsible for rendering and drawing content to be displayed on a display screen. In some embodiments, the processor 1401 may further include an artificial intelligence (AI) processor. The AI processor is configured to process a computing operation related to machine learning.

The memory 1402 may include one or more computer-readable storage media. The computer-readable storage medium may be non-transient. The memory 1402 may further include a high-speed random access memory (RAM) and a non-volatile memory, for example, one or more disk storage devices or flash storage devices. In some embodiments, the non-transient computer-readable storage medium in the memory 1402 is configured to store at least one computer-readable instruction, and the at least one computer-readable instruction is used for being executed by the processor 1401 to implement the speech-to-text conversion method provided in the method embodiments of this application.

In some embodiments, the terminal 1400 may optionally further include: a peripheral device interface 1403 and at least one peripheral device. The processor 1401, the memory 1402, and the peripheral device interface 1403 may be connected through a bus or a signal cable. Each peripheral device may be connected to the peripheral device interface 1403 through a bus, a signal cable, or a circuit board. Specifically, the peripheral includes at least one of a radio frequency circuit 1404, a display screen 1405, a camera assembly 1406, an audio circuit 1407, a positioning assembly 1408, and a power supply 1409.

A person skilled in the art may understand that the structure shown in FIG. 14 does not constitute a limitation on the terminal 1400, and the terminal may include more components or fewer components than those shown in the figure, or some components may be combined, or a different component deployment may be used.

Figure 15:
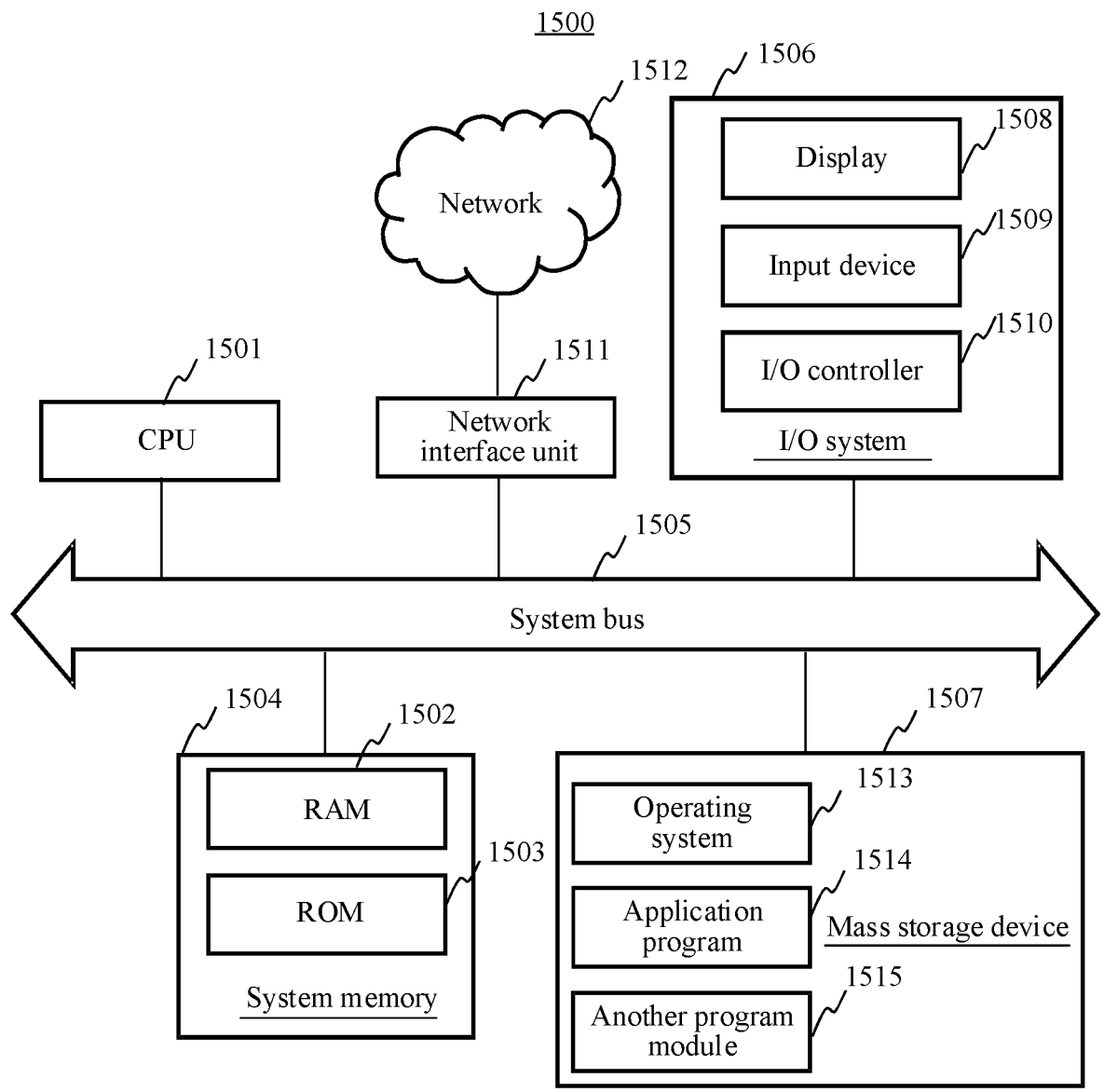
FIG. 15 is a schematic structural diagram of a server according to an exemplary embodiment of this application.

FIG. 15 is a schematic structural diagram of a server according to an embodiment of this application. Specifically, the server 1500 includes a CPU 1501, a system memory 1504 including a RAM 1502 and a read-only memory (ROM) 1503, and a system bus 1505 connecting the system memory 1504 and the CPU 1501. The computer device 1500 further includes a basic input/output (I/O) system 1506 assisting in transmitting information between components in the computer, and a mass storage device 1507 configured to store an operating system 1513, an application program 1514, and another program module 1515.

The basic I/O system 1506 includes a display 1508 configured to display information, and an input device 1509 configured to allow a user to enter information, for example, a mouse or a keyboard. The display 1508 and the input device 1509 are both connected to the CPU 1501 by using an input/output controller 1510 connected to the system bus 1505. The basic I/O system 1506 may further include the input/output controller 1510 to be configured to receive and process inputs from a plurality of other devices such as a keyboard, a mouse, and an electronic stylus. Similarly, the input/output controller 1510 further provides an output to a display screen, a printer, or another type of output device.

The mass storage device 1507 is connected to the CPU 1501 by using a mass storage controller (not shown) connected to the system bus 1505. The mass storage device 1507 and a computer-readable medium associated with the mass storage device 1507 provide non-volatile storage for the server 1500. That is, the mass storage device 1507 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in art can learn that the computer storage medium is not limited to the foregoing several types. The system memory 1504 and the mass storage device 1507 may be collectively referred to as a memory.

According to various embodiments of this application, the server 1500 may further be connected, by using a network such as the Internet, to a remote computer on the network and run. That is, the server 1500 may be connected to a network 1512 by using a network interface unit 1511 that is connected to the system bus 1505, or may be connected to a network of another type or a remote computer system (not shown) by using the network interface unit 1511.

According to another aspect of this application, a computer-readable storage medium is further provided, storing at least one piece of program code, the program code being loaded and executed by a processor to implement the foregoing speech-to-text conversion method.

According to another aspect of this application, a computer program product or a computer program is further provided, the computer program product or the computer program including computer-readable instructions, the computer-readable instructions being stored in a computer-readable storage medium. A processor of a computer device reads the computer-readable instructions from the computer-readable storage medium and executes the computer-readable instructions to cause the computer device to perform the foregoing speech-to-text conversion method.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

It is to be understood that the term "a/the plurality of" mentioned in this specification means two or more. The terms "and/or" describes an association relationship between associated objects and represents that three relationships may exist. For example, A and/or B may represent the following three cases: only A exists, both A and B exist, and only B exists. The character "/" generally indicates an "or" relationship between the associated objects.

A person of ordinary skill in the art may understand that all or some of the steps of the foregoing embodiments may be implemented by hardware, or may be implemented by a program instructing related hardware. The program may be stored in a computer-readable storage medium. The storage medium may be a ROM, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for performing speech-to-text conversion, the method comprising:
displaying, by a first device comprising a first memory storing instructions and a first processor in communication with the first memory, a first user interface, the first user interface being a display screen of a virtual environment that provides a virtual activity place for a first virtual role controlled by a first user account, the first user interface comprising a chat control;
displaying, by a second device comprising a second memory storing instructions and a second processor in communication with the second memory, a second user interface, the second user interface being a display screen of a virtual environment that provides a virtual activity place for a second virtual role controlled by a second user account;
transmitting, by the first device, a first geographic information indicating a geographical location of the first device to a server;
transmitting, by the second device, a second geographic information indicating a geographical location of the second device to the server; and
in response to an input start operation performed on the chat control, displaying, by the first device, a speech recording prompt at a peripheral position of the chat control on the first device, the speech recording prompt being for prompting a user that the first device is receiving speech content;
in response to an input end operation performed on the chat control on the first device,
canceling, by the first device, display of the speech recording prompt,
transmitting, by the first device, the received speech content to a server, for the server to generate a chat message in a first language and a chat message in a second language according to the speech content, the first language being determined based on the first geographic information, the second language is being determined based on the second geographic information, and
displaying, by the first device, the chat message in the first language after receiving the chat message in the first language that is transmitted by the server, a display position of the chat message in the first language being set by the first user account,
displaying, by the second device, the chat message in the second language after receiving the chat message in the second language that is transmitted by the server, wherein-text content of the chat message is recognized based on the speech content; and
in response to a display time of the chat message in the first language reaching a preset duration, canceling, by the first device, display of the chat message in the first language.

2. The method according to claim 1, wherein the method further comprises at least one of the following:
transmitting, by the first device, the first language to the server; and
transmitting, by the second device, the second language to the server.

3. The method according to claim 1, further comprising:
in response to a first display cancel operation, canceling, by the first device, display of the chat message in the first language.

4. The method according to claim 1, further comprising:
displaying, by the second device, the chat message in the first language and the second language.

5. A system for performing speech-to-text conversion, the system comprising:
one or more memories storing instructions; and
one or more processors in communication with the one or more memories, wherein, when the one or more processors execute the instructions, the one or more processors are configured to cause the system to perform:
displaying a first user interface on a first device, the first user interface being a display screen of a virtual environment that provides a virtual activity place for a first virtual role controlled by a first user account, the first user interface comprising a chat control,
displaying a second user interface on a second device, the second user interface being a display screen of a virtual environment that provides a virtual activity place for a second virtual role controlled by a second user account, and
transmitting, by the first device, a first geographic information indicating a geographical location of the first device to a server,
transmitting, by the second device, a second geographic information indicating a geographical location of the second device to the server, and
in response to an input start operation performed on the chat control, displaying, by the first device, a speech recording prompt at a peripheral position of the chat control on the first device, the speech recording prompt being for prompting a user that the first device is receiving speech content;

in response to an input end operation performed on the chat control on the first device,
canceling, by the first device, display of the speech recording prompt,
transmitting, by the first device, the received speech content to a server, for the server to generate a chat message in a first language and a chat message in a second language according to the speech content, the first language being determined based on the first geographic information, the second language is being determined based on the second geographic information, and
displaying, by the first device, the chat message in the first language after receiving the chat message in the first language that is transmitted by the server,
displaying, by the second device, the chat message in the second language after receiving the chat message in the second language that is transmitted by the server, wherein:
the first language is a language associated with the first user account or the first device,
the second language is a language associated with the second user account or the second device, and
text content of the chat message is recognized based on the speech content; and
in response to a display time of the chat message in the first language reaching a preset duration, canceling, by the first device, display of the chat message in the first language.

6. The system according to claim 5, wherein, when the one or more processors execute the instructions, the one or more processors are configured to further cause the system to perform at least one of the following:
transmitting, from the first device, the first language to the server; and
transmitting, from the second device, the second language to the server.

7. The system according to claim 5, wherein, when the one or more processors execute the instructions, the one or more processors are configured to further cause the system to perform:
in response to a display time of the chat message in the first language reaching a preset duration, canceling, on the first device, display of the chat message in the first language; or
in response to a first display cancel operation, canceling, on the first device, display of the chat message in the first language.

8. The system according to claim 5, wherein, when the one or more processors execute the instructions, the one or more processors are configured to further cause the system to perform:
displaying, by the second device, the chat message in the first language and the second language.

9. A non-transitory computer-readable storage medium, storing computer-readable instructions, wherein, the computer-readable instructions, when executed by one or more processors, are configured to cause the one or more processors to perform:
displaying a first user interface on a first device, the first user interface being a display screen of a virtual environment that provides a virtual activity place for a first virtual role controlled by a first user account, the first user interface comprising a chat control;
displaying a second user interface on a second device, the second user interface being a display screen of a virtual environment that provides a virtual activity place for a second virtual role controlled by a second user account;
transmitting, by the first device, a first geographic information indicating a geographical location of the first device to a server;
transmitting, by the second device, a second geographic information indicating a geographical location of the second device to the server; and
in response to an input start operation performed on the chat control, displaying, by the first device, a speech recording prompt at a peripheral position of the chat control on the first device, the speech recording prompt being for prompting a user that the first device is receiving speech content;
in response to an input end operation performed on the chat control on the first device,
canceling, by the first device, display of the speech recording prompt,
transmitting, by the first device, the received speech content to a server, for the server to generate a chat message in a first language and a chat message in a second language according to the speech content, the first language being determined based on the first geographic information, the second language is being determined based on the second geographic information, and
displaying, by the first device, the chat message in the first language after receiving the chat message in the first language that is transmitted by the server,
displaying, by the second device, the chat message in the second language after receiving the chat message in the second language that is transmitted by the server, wherein
text content of the chat message is recognized based on the speech content; and
in response to a display time of the chat message in the first language reaching a preset duration, canceling display of the chat message in the first language.

10. The non-transitory computer-readable storage medium according to claim 9, wherein, the computer-readable instructions, when executed by one or more processors, are configured to further cause the one or more processors to perform at least one of the following:
transmitting, from the first device, the first language to the server; and
transmitting, from the second device, the second language to the server.

11. The non-transitory computer-readable storage medium according to claim 9, wherein, the computer-readable instructions, when executed by one or more processors, are configured to further cause the one or more processors to perform:
in response to a display time of the chat message in the first language reaching a preset duration, canceling, on the first device, display of the chat message in the first language; or
in response to a first display cancel operation, canceling, on the first device, display of the chat message in the first language.

* * * * *